(12) United States Patent
Liu et al.

(10) Patent No.: US 11,461,879 B2
(45) Date of Patent: Oct. 4, 2022

(54) IMAGE PROCESSING METHOD, DEVICE AND STORAGE MEDIUM

(71) Applicant: MONTAGE LZ TECHNOLOGIES (CHENGDU) CO., LTD., Chengdu (CN)

(72) Inventors: Chengqiang Liu, Chengdu (CN); Zhimin Qiu, Chengdu (CN); ChiaChen Chang, Chengdu (CN)

(73) Assignee: MONTAGE LZ TECHNOLOGIES (CHENGDU) CO., LTD., Sichuan (CN)

(*) Notice: Subject to any disclaimer, the term of this patent is extended or adjusted under 35 U.S.C. 154(b) by 18 days.

(21) Appl. No.: 17/106,190

(22) Filed: Nov. 30, 2020

(65) Prior Publication Data

US 2021/0183029 A1 Jun. 17, 2021

(30) Foreign Application Priority Data

Dec. 13, 2019 (CN) .......................... 201911282876.9

(51) Int. Cl.
   *G06T 5/00* (2006.01)
(52) U.S. Cl.
   CPC .... *G06T 5/009* (2013.01); *G06T 2207/10024* (2013.01); *G06T 2207/20208* (2013.01)

(58) Field of Classification Search
   CPC ........... G06T 5/009; G06T 2207/10024; G06T 2207/20208; H04N 1/6066; H04N 9/04513; H04N 9/0451
   See application file for complete search history.

(56) References Cited

U.S. PATENT DOCUMENTS

2016/0065927 A1* 3/2016 Yamada ................. H04N 5/775
386/304

* cited by examiner

*Primary Examiner* — Phuoc Tran
(74) *Attorney, Agent, or Firm* — Jun He Law Offices P.C.; James J. Zhu

(57) ABSTRACT

An image processing method converts an original image represented in an original color gamut to a target image represented in a target color gamut. The image processing method comprises: A) calculating a set of primary color direction deviations between a set of original primary color directions of the original color gamut and a set of target primary color directions of the target color gamut, wherein each of the set of primary color direction deviations corresponds to a primary color; B) determining, for each pixel in the original image, a corrected color coordinate of the pixel based on a set of offsets of an original color coordinate of the pixel in the original color gamut relative to the set of original primary color directions and the set of primary color direction deviations; and C) mapping, for each pixel in the original image, the corrected color coordinate of the pixel into the target color gamut to generate a target color coordinate of the pixel in the target color gamut.

10 Claims, 7 Drawing Sheets

IMAGE PROCESSING METHOD, DEVICE AND STORAGE MEDIUM

CROSS REFERENCE TO RELATED APPLICATIONS

This application is based on and claims priority to Chinese Patent Application No. 201911282876.9 filed on Dec. 13, 2019, the entire content of which is incorporated herein by reference.

TECHNICAL FIELD

The application generally relates to image processing technology, and more particularly to an image processing method, device and storage medium.

BACKGROUND

High Dynamic Range (HDR) video and image can provide higher dynamic range and more color information compared with standard dynamic range (SDR) video and image. Currently popular HDR formats mainly include HDR10, Hybrid-Log Gamma (HLG), Dolby Vision, etc. However, if displayed on SDR display devices, the video or image using such HDR formats needs to be converted in format. The HDR to SDR format conversion generally includes dynamic range compression and color gamut compression. However, color gamut compression algorithms (e.g. a method for compressing color gamut BT.2020 to color gamut BT.709 provided in Annex 5 of International Telecommunication Union standard ITU-R BT.2047-0) used in conventional HDR to SDR format conversion may introduce color shift in the images, thereby affecting the display of the video images.

Thus, there is a need to improve the conventional HDR to SDR conversion.

SUMMARY

An objective of the present application is to address the color shift issue introduced by conventional color gamut compression methods.

According to an aspect of the present application, there is provided an image processing method for converting an original image represented in an original color gamut to a target image represented in a target color gamut. The image processing method comprises: A) calculating a set of primary color direction deviations between a set of original primary color directions of the original color gamut and a set of target primary color directions of the target color gamut, wherein each of the set of primary color direction deviations corresponds to a primary color; B) determining, for each pixel in the original image, a corrected color coordinate of the pixel based on a set of offsets of an original color coordinate of the pixel in the original color gamut relative to the set of original primary color directions and the set of primary color direction deviations; and C) mapping, for each pixel in the original image, the corrected color coordinate of the pixel into the target color gamut to generate a target color coordinate of the pixel in the target color gamut.

In some other aspects of the present application, there is provided an image processing device and a storage medium.

The foregoing is a summary of the present application, may be simplified or generalized, and some details may be omitted. Thus, it should be appreciated by those skilled in the art that this part is only exemplary and illustrative, but is not intended to limit the scope of the present application in any ways. This summary part is neither intended to determine the key features or necessary features of the subject sought to be protected, nor intended to be used as a supplementary means for determining the scope of the subject sought to be protected.

BRIEF DESCRIPTION OF THE DRAWINGS

The aforementioned features and other features of the present application will be fully understood via the following specification and the appended claims in combination with the accompanying drawings. It can be understood that, these accompanying drawings merely illustrate certain embodiments in accordance with the present application and should not be considered as limitation to the scope of the present application. By using the accompanying drawings, the content of the present application will be described more explicitly and detailedly.

DETAILED DESCRIPTION

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without departing from the spirit and scope of the application. It can be understood that, the various aspects of the application described and graphically presented herein may be arranged, replaced, combined, divided and designed in many different configurations, and these different configurations are explicitly incorporated in the application.

Figure 1:
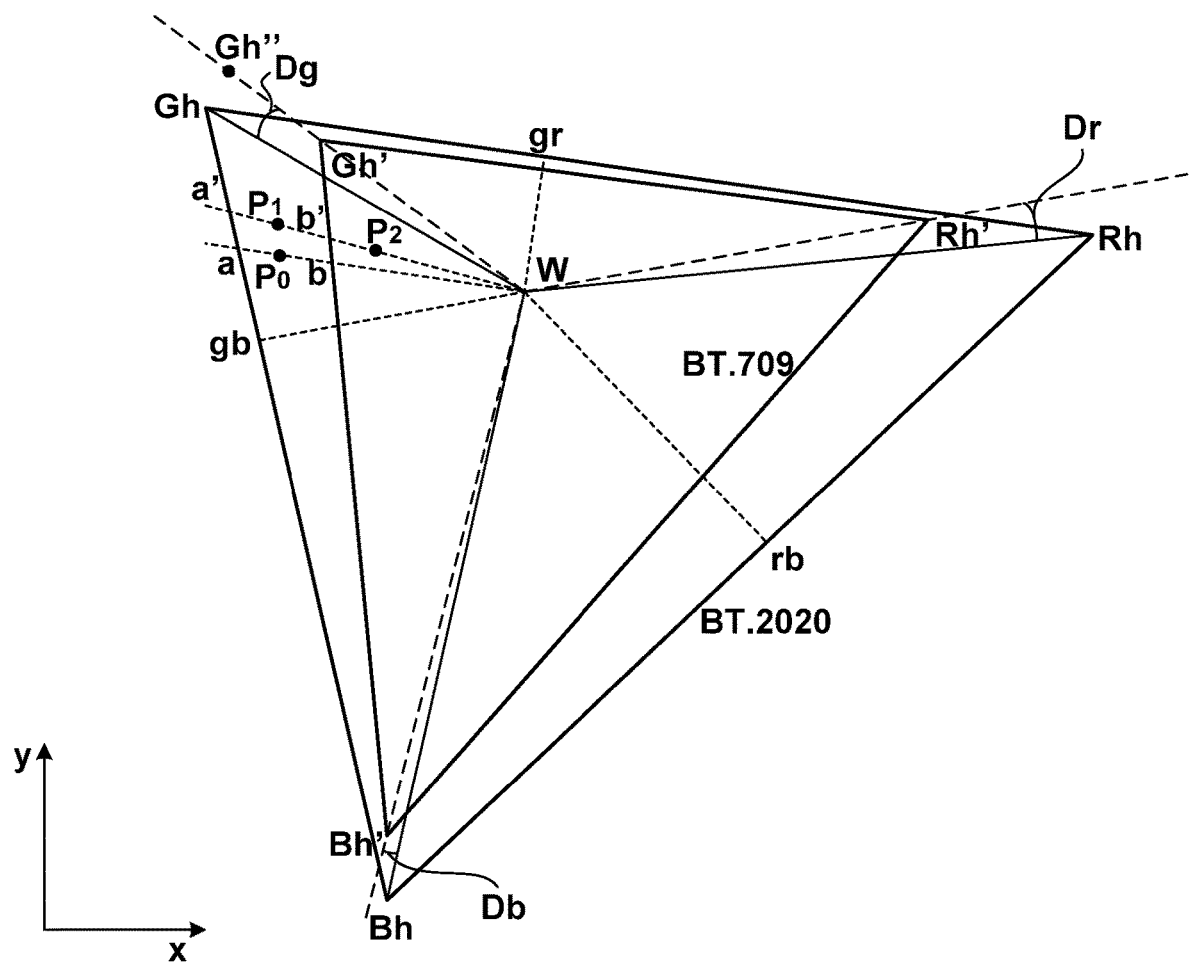
FIG. 1 shows a comparison between color gamut BT.2020 in Luv color space and color gamut BT.709 in Luv color space.

FIG. 1 shows a comparison between color gamut BT.2020 in Luv color space and color gamut BT.709 in Luv color space. Both of the color gamut BT.2020 and BT.709 are common formats in Luv color space, while the color gamut BT.2020 has a bigger color gamut range than the color gamut BT.709. As such, if an image represented in the BT.2020 format needs to be displayed on a display device in compliance with the BT.709 format, the original image represented in the BT.2020 format needs to be processed to be converted to a target image represented in the BT.709 format. The processed target image can then be displayed in the corresponding display device.

In some embodiments, the color space used by the original image may be RGB, YCbCr or other color spaces.

Accordingly, the color spaces of the original images can first be converted to the Luv color space and then processed with the above format conversion.

The inventors of the present application have found that there are deviations between respective color directions of the above two color gamut in Luv color space shown in FIG. 1. For example, a green direction WGh (from a white point W to a green vertex Gh) of the BT.2020 format substantially deviates from a green direction WGh' (from the white point W to a green vertex Gh') of the BT.709 format; and a red direction WRh (from the white point W to a red vertex Rh) of the BT.2020 format substantially deviates from a red direction WRh' (from the white point W to a red vertex Rh') of the BT.709 format. Such deviations are the cause for the color shift in the processed images.

In order to correct the aforementioned color shift, the image processing methods of the present application can determine deviations between respective primary color directions of two color gamut, and consider such deviations during subsequent coordinate conversions of pixels of the images being processed. This processing method can effectively resolve the color shift problem after format conversion.

Figure 2:
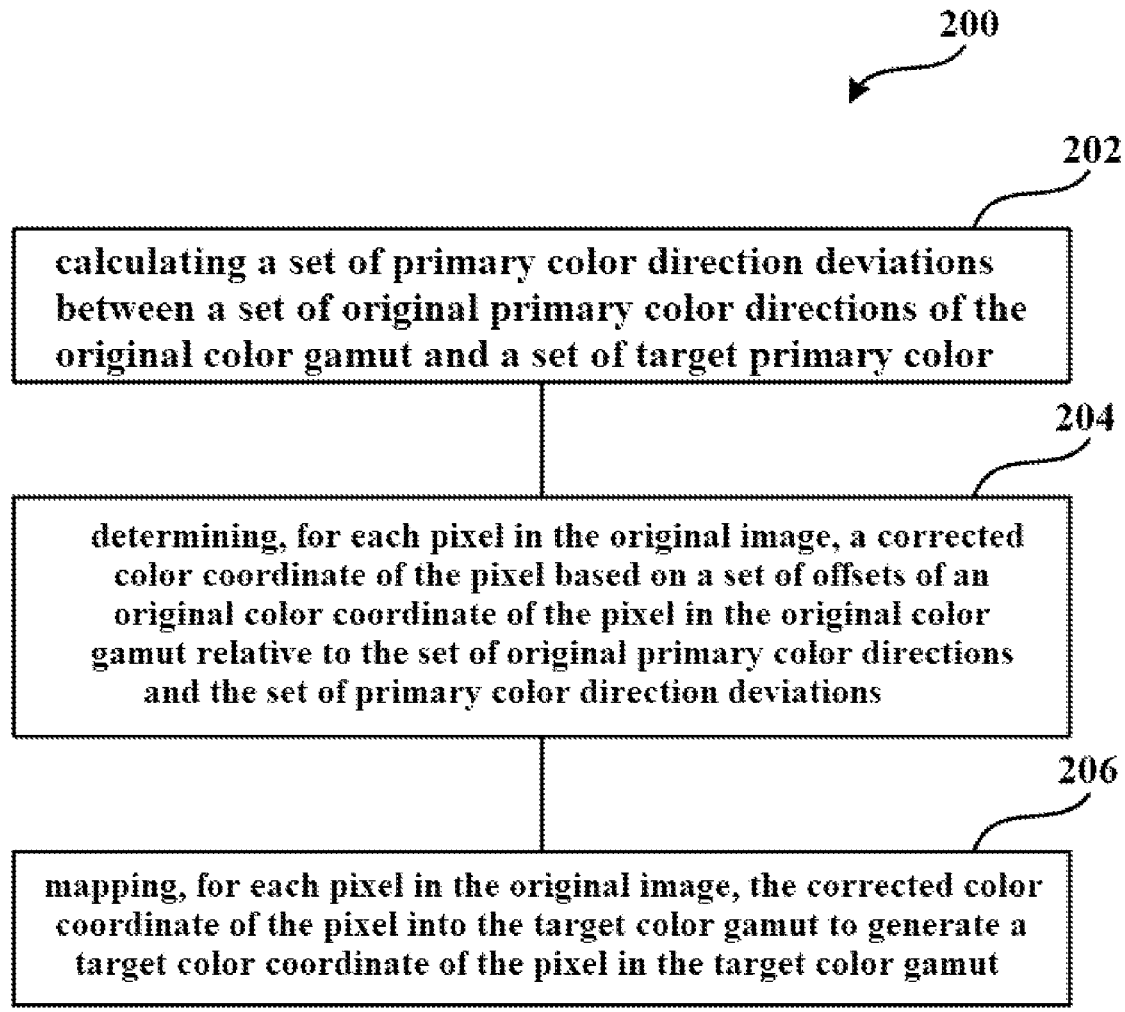
FIG. 2 shows an image processing method 200 according to an embodiment of the present application.

FIG. 2 shows an image processing method 200 according to an embodiment of the present application. The image processing method 200 can be used for gamut format conversion in Luv color space. In the following, the image processing method 200 will be described with reference to the example where the color gamut BT.2020 in Luv color space is converted to the color gamut BT.709 in Luv color space, as shown in FIGS. 1 and 2.

As shown in FIG. 2, in step 202, a set of primary color direction deviations between a set of original primary color directions of the original color gamut (e.g. the color gamut BT.2020 shown in FIG. 1) and a set of target primary color directions of the target color gamut (e.g. the color gamut BT.709 shown in FIG. 2) are calculated. Each of the set of primary color direction deviations corresponds to a primary color.

In some embodiments, both the original color gamut and the target color gamut use a set of three primary colors, i.e. red, green and blue. Accordingly, the primary color direction deviations between the original primary color directions and the target primary color directions include a red direction deviation, a green direction deviation and a blue direction deviation. FIG. 1 shows the red direction deviation Dr, the green direction deviation Dg and the blue direction deviation Db. Preferably, the primary color direction deviations can be represented by degrees or by trigonometric values (e.g. tangent values) associated with degrees. The primary color direction deviations can be calculated based on positions (e.g. coordinates) in a color gamut triangle.

It can be appreciated that each pixel in the original image has a color represented by an original color coordinate in the original color gamut, such as a coordinate of the green vertex Gh or another color coordinate $P_0$ shown in FIG. 1, which depends on the actual color of each pixel. In some embodiments, it is desired to adjust and convert only the original colors of all the pixels of the original image being processed. For example, for a solid-colored image, a single calculation on the color of the image is needed. In some other embodiments, the conversion relationship between the original color gamut and the target color gamut can be pre-generated, without considering the actual colors of the pixels of the original image being processed. As such, each color coordinate in the original color gamut can be converted into a color coordinate in the target color gamut to generate the conversion relationship. In this way, during image processing, especially when multiple original images are required to be processed, the conversion relationship can be inquired for all the pixels in the original image to implement color conversion for all these pixels, and then the corrected color coordinate of each pixel of the original image can be determined based on a set of offsets of its original color coordinate in the original color gamut relative to the set of original primary color directions and the set of primary color direction deviations.

As aforementioned, since there are deviations between the respective primary color directions of the original color gamut and the target color gamut, in step 204, these deviations can be calculated and corrected. With reference to FIG. 1, the original green direction WGh can be corrected to the target green direction WGh', and an original color direction $WP_0$ of the exemplary original color coordinate $P_0$ can be corrected to a target color direction $WP_1$, wherein $P_1$ is a corrected color coordinate corresponding to the original color coordinate $P_0$.

It can be appreciated that the white point does not have color deviation and the three primary colors generally have the maximum color direction deviations, while the other colors generally have relatively smaller color direction deviations. In general, if a color is closer to one of the primary colors, it may have bigger color direction deviation(s). As such, the corrected color coordinate of each color may be calculated based on the offsets of the original color coordinate of the color relative to the set of original primary color directions, especially the offsets relative to one or more adjacent original primary color directions. For example, for an original color relatively close to the green vertex Gh, its corrected color coordinate can be calculated based on an offset of the original color direction of the original color relative to the original green direction. For an original color relatively close to the red vertex Rh, its corrected color coordinate can be calculated based on an offset of the original color direction of the original color relative to the original red direction. It can be appreciated that, in other examples, the corrected color coordinates can be calculated based on respective offsets of the original color directions relative to two or more primary color directions, which will be elaborated below in more details.

In some embodiments, the original color gamut can be divided into three color sub-regions based on their positions relative to the three primary color directions. For example, as shown in FIG. 1, the original color gamut is divided into three color sub-regions, i.e. a green sub-region Zg, a red sub-region Zr and a blue sub-region Zb. The green sub-region Zg and the blue sub-region Zb are separated by a perpendicular line Wgb that is perpendicular to a corresponding boundary of the original color gamut triangle and passes through the white point W and a pedal gb; the green sub-region Zg and the red sub-region Zr are separated by a perpendicular line Wgr that is perpendicular to a corresponding boundary of the original color gamut triangle and passes through the white point W and a pedal gr; the red sub-region Zr and the blue sub-region Zb are separated by a perpendicular line Wrb that is perpendicular to a corresponding boundary of the original color gamut triangle and passes through the white point W and a pedal rb. It can be seen that the original color coordinate $P_0$ is within the green sub-region Zg close to the green direction WGh, and therefore the corrected color coordinate and corrected color direction for $P_0$ can be calculated based on the green direction deviation Dg and an offset of $P_0$ relative to the green direction deviation. The particulars of the calculation will be elaborated below.

Figure 4:
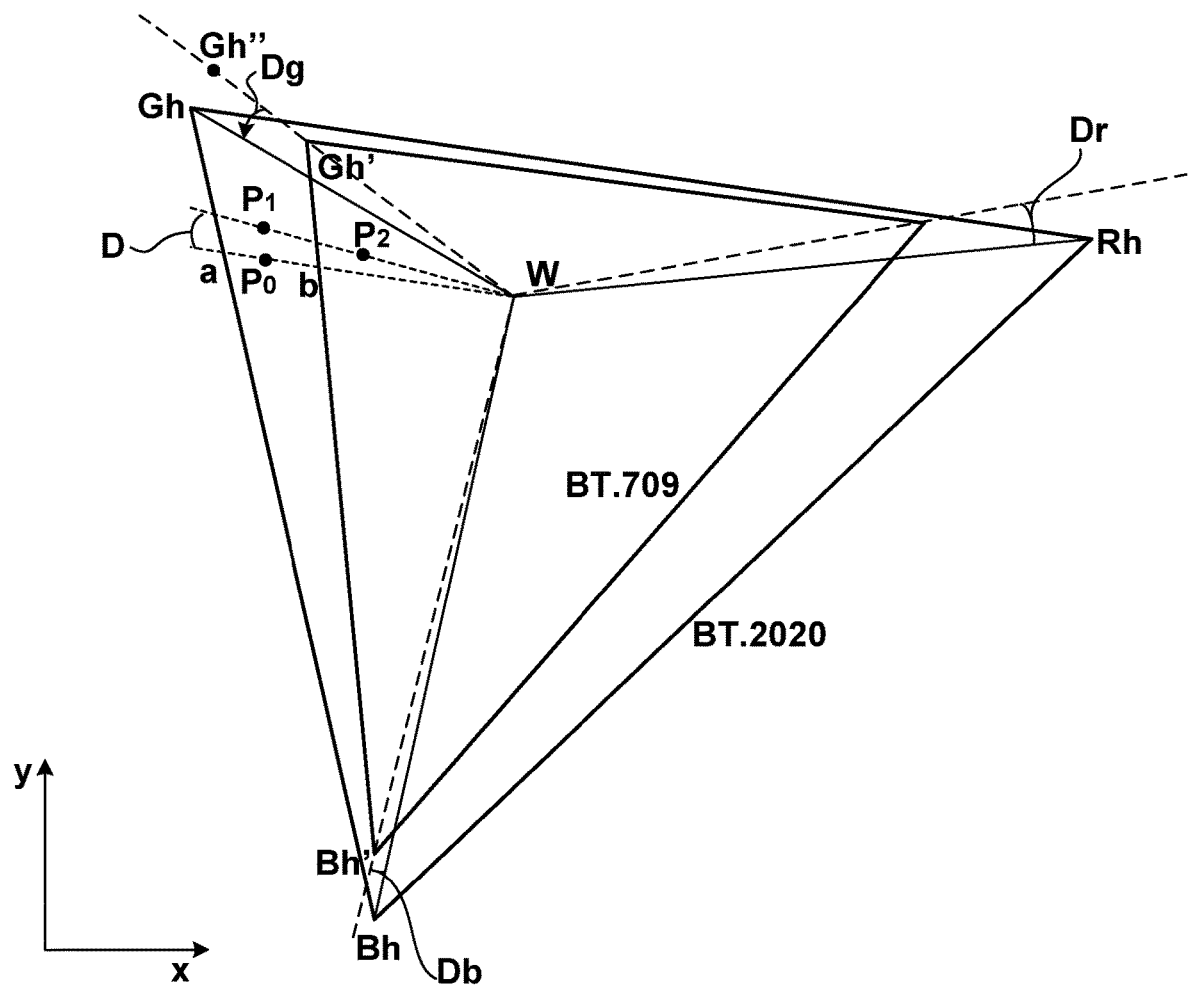
FIGS. 4 and 5 show respective methods for correcting color direction deviations.

It can be appreciated that the original color gamut can be divided into a plurality of color sub-regions in other manners, based on the positions relative to each two adjacent primary color directions of the original color gamut. For example, as shown in FIG. 4, based on the green direction WGh, the red direction WRh and the blue direction WBh, the original color gamut can be divided into three color sub-regions, i.e. a green-red sub-region defined by the green direction WGh, the red direction WRh and the corresponding boundary of the original color gamut therebetween, a red-blue sub-region defined by the red direction WRh, the blue direction WBh and the corresponding boundary of the original color gamut therebetween, and a blue-green sub-region defined by the blue direction WBh, the green direction WGh and the corresponding boundary of the original color gamut therebetween. Accordingly, for an original color coordinate in each color sub-region, its corrected color direction can be calculated based on one or two original primary color directions associated with the color sub-region where the original color coordinate is located and the corresponding one or two primary color direction deviations, and further the corrected color coordinate of the original color coordinate can be calculated based on the corrected color direction and the original color coordinate. For example, for the original color coordinate $P_0$ located within the blue-green sub-region, the blue direction deviation Db and the green direction deviation Dg are the two primary color direction deviations associated with the blue-green sub-region. Therefore, the corrected color direction and the corrected color coordinate $P_1$ for $P_0$ can be calculated based on the two primary color direction deviations and the original color coordinate $P_0$. The particulars of the calculation will be elaborated below.

After correction, the original color coordinate $P_0$ is corrected to the corrected color coordinate $P_1$ and the green vertex coordinate Gh is corrected to a corrected green vertex coordinate Gh". It can be seen that the corrected color coordinate $P_1$ is still outside the target color gamut. Therefore, further steps are required to adjust the corrected color coordinate $P_1$ to within the target color gamut.

Specifically, in step 206, for each pixel in the original image, the corrected color coordinate of the pixel is mapped into the target color gamut to generate a target color coordinate of the pixel in the target color gamut.

Since each corrected color coordinate has a desired corrected color direction, the color mapping is required for each corrected color coordinate, that is, scaling a distance from the corrected color coordinate to the white point W in the determined corrected color direction, such as linear scaling. Specifically, the scaling step can include calculating a target color coordinate in the target color gamut for the original color coordinate based on positions relative to the corresponding boundary of the original color gamut and relative to the corresponding boundary of the corrected color gamut in the corrected color direction. After scaling, each original color coordinate is adjusted to a target color coordinate in the target color gamut. For example, as shown in FIG. 1, the original color coordinate $P_0$ is adjusted to a target color coordinate $P_2$, the green vertex coordinate Gh is adjusted to the target green vertex coordinate Gh', and the red vertex coordinate Rh is adjusted to the target red vertex coordinate Rh'. In some embodiments, the calculation of color mapping should consider the positions of the corrected color ordinate relative to the target color gamut and the original color gamut. The particulars of the calculation will be elaborated below.

It can be seen that, through the above steps, the original color coordinate in the original color gamut can be converted into a corrected color coordinate in the corrected color gamut and color shift can be eliminated.

It can be appreciated that the steps 202 to 206 are mainly used for color adjustment. However, the original image format may have a different lightness format than the target image format. For example, a target image format SDR may have a lower lightness range compared with an original image format HDR10. Accordingly, before or after the color adjustment, the original lightness of each pixel in the original image can be adjusted to convert the original lightness range of the original image into the target lightness range of the target image.

Figure 3:
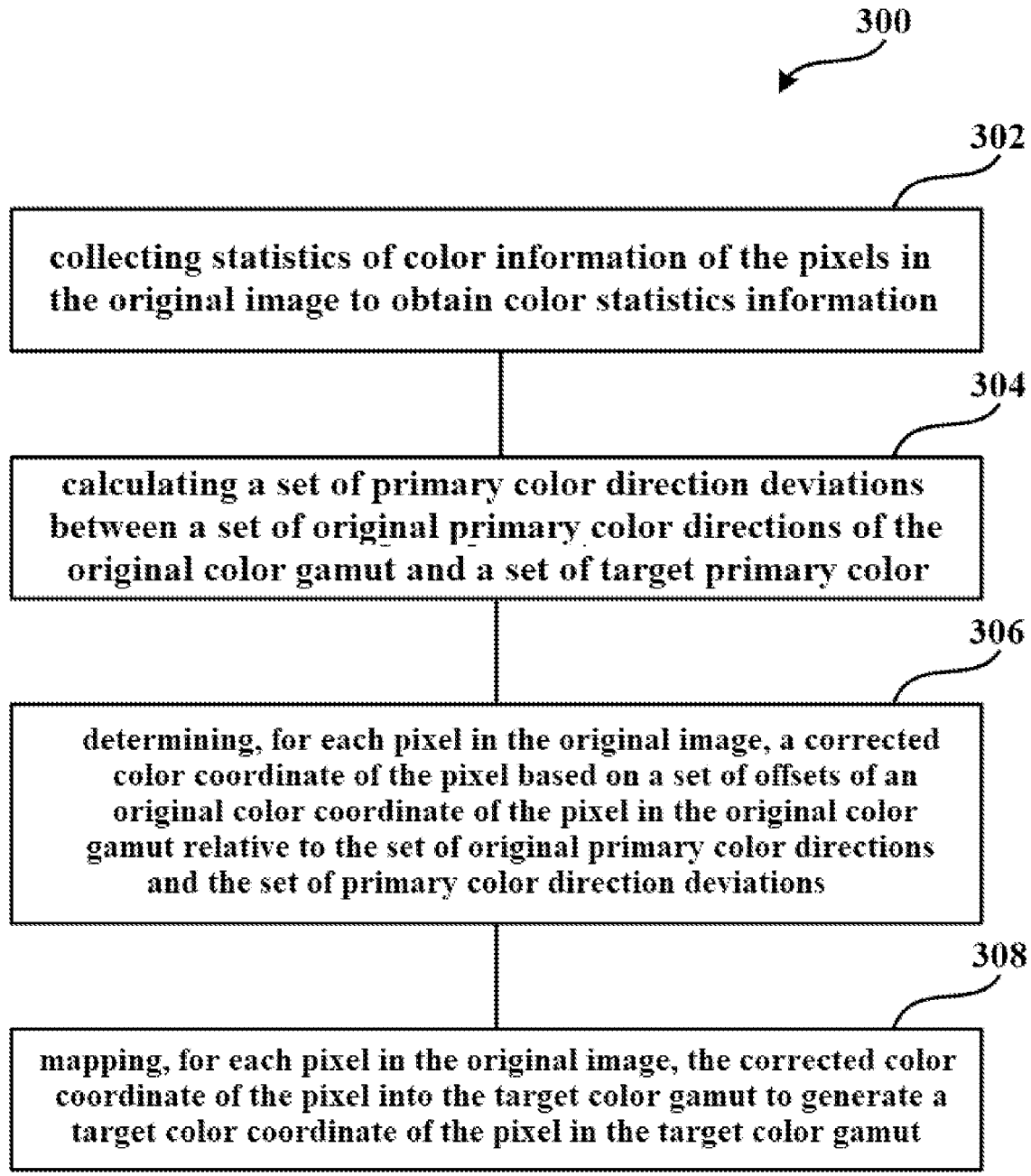
FIG. 3 shows an image processing method 300 according to an embodiment of the present application.

FIG. 3 shows an image processing method 300 according to an embodiment of the present application. The image processing method 300 can be used for gamut format conversion in Luv color space, for example, from the color gamut BT.2020 in Luv color space to the color gamut BT.709 in Luv color space as shown in FIG. 1, i.e. for converting an original image having an original color gamut (e.g. the color gamut BT.2020 shown in FIG. 1) into a target image having a target color gamut (e.g. the color gamut BT.709 shown in FIG. 1).

As shown in FIG. 3, in step 302, statistics of color information of the pixels in the original image is collected to obtain color statistics information. The color statistics information includes a number or a ratio of out-range pixels in the original image, and a statistical out-range level of the out-range pixels.

Specifically, the out-range pixels refer to pixels with original color coordinates outside the target color gamut, and an out-range level for each out-range pixel indicates a level of the original color coordinate of the out-range pixel that outranges the target color gamut. In some embodiments, the out-range level can be calculated as a ratio between a distance from the original color coordinate of a pixel to an boundary of the target color gamut and a distance from the boundary of the target color gamut to a corresponding boundary of the original color gamut, both in a direction that connects the white point and the pixel. For example, for the original color coordinate $P_0$ shown in FIG. 1, its out-range level can be calculated as $P_0b/ba$, wherein $P_0b$ is a distance from the original color coordinate $P_0$ to an boundary Gh'Bh' of the target color gamut, while ba is a distance from an boundary GhBh of the original color gamut BT.2020 to the boundary Gh'Bh' of the corresponding boundary of the target color gamut BT.709 in the corresponding color direction of the original color coordinate $P_0$. Accordingly, the out-range level can range from 0 to 1, wherein an out-range level 0 indicates that the original color coordinate is located at the boundary of the target color gamut (i.e. at point b shown in FIG. 1), while an out-range level 1 indicates that the original color coordinate is located at the boundary of the original color gamut (i.e. at point a shown in FIG. 1). The statistical out-range level can be a statistical value, e.g. an average or medium, of the out-range levels of all or a portion of the out-range pixels (e.g. sampled pixels).

The color statistics information obtained in step 302 can be used for subsequent color mapping process, which will be described below. It can be appreciated that the color statistics information collection in step 302 can be omitted in some embodiments, and accordingly, the color mapping may not refer to or use such color statistics information, which will be elaborated below with reference to examples.

In step 304, a set of primary color direction deviations between a set of original primary color directions of the original color gamut and a set of target primary color directions of the target color gamut is calculated, wherein each of the set of primary color direction deviations corresponds to a primary color. In step 306, for each pixel in the original image, a corrected color coordinate of the pixel based on a set of offsets of an original color coordinate of the pixel in the original color gamut relative to the set of original primary color directions and the set of primary color direction deviations is determined.

Figure 5:
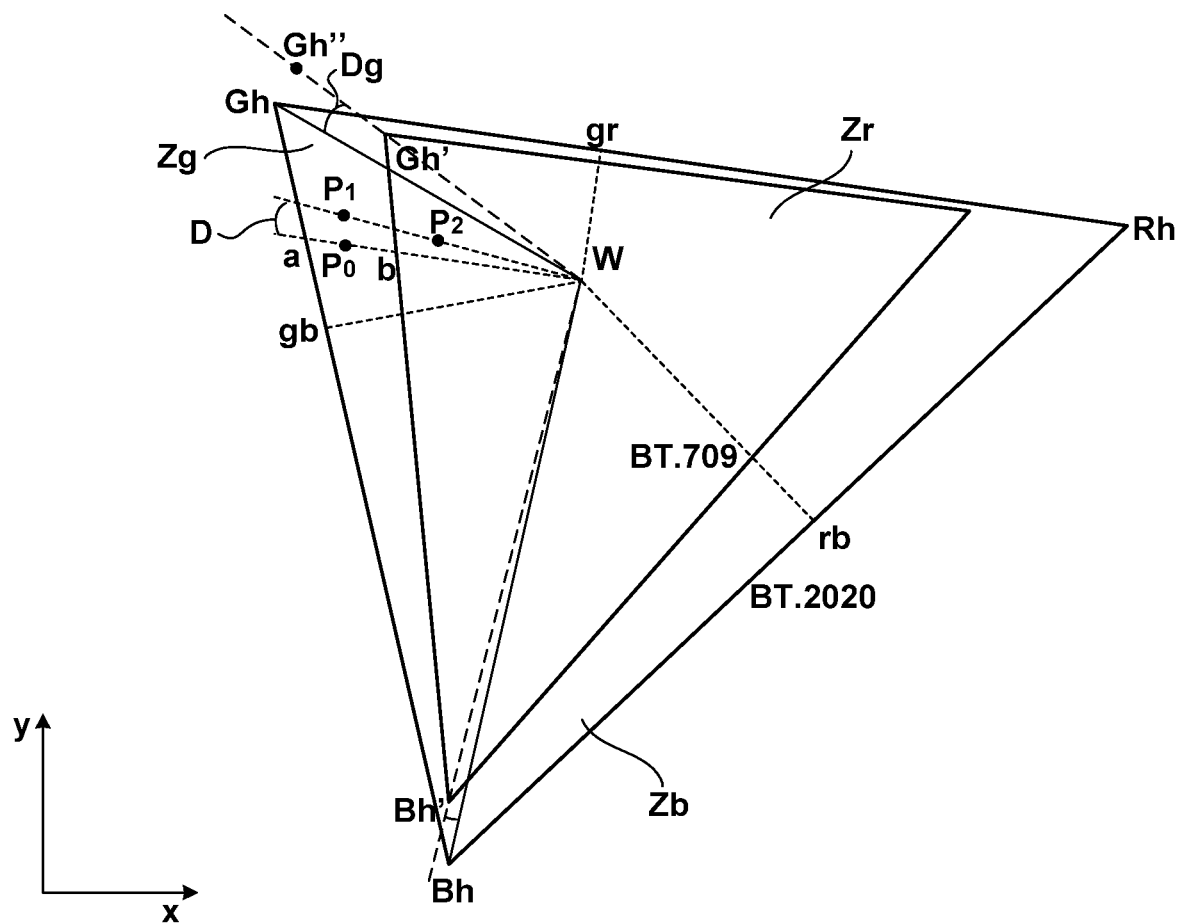

Similar to the step 202 shown in FIG. 2, the color correction of step 304 is used for correcting the deviation between the corresponding color directions of the original color gamut and the target color gamut. Various algorithms can be used for the correction of color direction deviations based on the geometric calculation used. FIGS. 4 and 5 show two method for correcting the color direction deviations.

As shown in FIG. 4, the original color gamut BT.2020 has three primary color vertexes including a green vertex Gh, a red vertex Rh and a blue vertex Bh; the target color gamut BT.709 has three primary color vertexes including a green vertex Gh', a red vertex Rh' and a blue vertex Bh'. The corresponding primary color vertexes have respective primary color direction deviations, i.e. a red direction deviation Dr, a green direction deviation Dg, and a blue direction deviation Db. The primary color direction deviations can be represented by an angle or a trigonometric function value corresponding to an angle. For example, the deviations can be represented by tangent values tan_green (green direction deviation), tan_red (red direction deviation) and tan_blue (blue direction deviation). The primary color direction deviations can be calculated using analytic geometry. In the following, the specific calculation is described with reference to an exemplary green direction deviation Dg corresponding to the green vertex.

As shown in FIG. 4, the green direction deviation Dg in substance corresponds to a maximum rotational angle between two vertexes Gh and Gh', which is an angle between straight lines WGh and WGh'. In the color space represented in a rectangular coordinate system (with a horizontal axis x and a vertical axis y), the straight line WGh can be represented by Equation (1):

$$y = k_{WGh} * x + l_{WGh} \quad (1)$$

wherein $k_{WGh}$ denotes a slope of the straight line WGh, and $l_{WGh}$ denotes a vertical intercept of the straight line. In the following, the straight line WGh will be denoted as $[k_{WGh}, l_{WGh}]$, and the other straight lines will be denoted similarly.

Similarly, the straight line WGh' can be denoted as $[k_{WGh'}, l_{WGh'}]$. Therefore, the tangent value tan_green of the green direction deviation can be calculated using Equation (2) which is based on a triangular function (tangent function) calculation equation.

$$\tan\_green = abs((k_{WGh'} - k_{WGh})/(1 + k_{WGh'} * k_{WGh})) \quad (2)$$

wherein abs denotes absolute value, a symbol or a correction direction of the green direction deviation may be determined using the direction shown in FIG. 4 (counterclockwise). It can be appreciated that the tangent value tan_red for the red direction deviation and the tangent value tan_blue for the blue direction deviation can be calculated using the same method. In other words, the color gamut is divided into three regions, each of which is defined by a boundary of the color gamut and two primary color directions. Depending on the region where the original color coordinate is, different primary color directions can be used for coordinate correction.

Still referring to FIG. 4, assuming that a pixel has an original color coordinate $P_0$ which is between the green direction WGh and the blue direction WBh, then an offset of the original color coordinate relative to the green direction and the blue direction can be determined using the following method.

Specifically, an intersection point of the straight line $WP_0$ connecting the white point W and the original color coordinate $P_0$ and the boundary of the color gamut BT.2020 is denoted as point a, and another intersection point of the straight line $WP_0$ and the boundary of the color gamut BT.709 is denoted as point b. It is assumed that point $P_0$ will be at point $P_1$ after correction. Accordingly, the corrected target color direction $WP_1$ corresponding to point $P_1$ can be obtained by linearly mapping a ratio between segment Gha and segment Bha, which is indicative of approximation of the target color direction $WP_1$ towards the green direction and the blue direction, onto the green direction deviation and the blue direction deviation (similar to weighting calculation). In implementation, the tangent values tan_green and tan_blue of the ratio relative to the respective color direction deviations can be used for calculation. In some embodiments, the mapping Equation (3) below can be used for calculating the offset, which, however, can be appreciated as an exemplary equation for the calculation.

$$\tan\_d = (\tan\_green * dist\_Bh\_a + \tan\_blue * dist\_Gh\_a) / (dist\_Bh\_a + dist\_Gh\_a) \quad (3)$$

wherein tan_d denotes the tangent value of a correction angle D (an angular difference between the correction direction $WP_1$ and the original direction $WP_0$), dist_Bh_a denotes a length of the segment Bha and dist_Gh_a denotes a length of the segment Gha.

In the embodiment shown in FIG. 4, the original color coordinate $P_0$ is between the green direction and the blue direction, and thus the correction direction $WP_1$ can be calculated based on these two primary color directions. If an original color coordinate of a pixel is within another region of the color gamut, its correction angle can be calculated based on two other primary color directions adjacent to the original color coordinate using the same method, which will not elaborated herein.

After obtaining the correction angle D, the corrected color coordinate P1 can be further calculated using Equation (4) below with the correction angle D taken into account, i.e. the original color coordinate $P_0(u_{p0}, v_{p0})$ is corrected to the coordinate $P_1(u_{p1}, v_{p1})$ shown in FIG. 4.

$$u_{p1} = (u_{p0} - u_w) * \cos D - (v_{p0} - v_w) * \sin D + u_w$$

$$v_{p1} = (v_{p0} - v_w) * \cos D + (u_{p0} - u_w) * \sin D + v_w \quad (4)$$

wherein the white point W has a coordinate $(u_w, v_w)$, D denotes the correction angle. Equation (4) is actually an analytic geometric calculation.

The calculation method described with reference to FIG. 4 takes into account the position of the original color coordinate relative to the two adjacent primary color directions. In some other embodiments, the calculation of the corrected color coordinate may take into account only the position of the original color coordinate relative to the closest primary color direction. FIG. 5 shows a correction method for calculating the corrected direction deviation, which takes into account only the distance from the original color coordinate to a primary color direction.

Specifically, as shown in FIG. 5, segment Wgb is a segment that is perpendicular to a boundary GhBh of the color gamut BT.2020 and passes through the white point W and a pedal gb. Similarly, segments Wgr and Wrb are two segments that are perpendicular to the other two boundaries GhRh and RhBh of the color gamut BT.2020 respectively, and pass through the white point W and two other pedals gr and rb respectively. These three segments divide the triangular region of the color gamut BT.2020 into three regions Zg, Zr and Zb, each of which corresponds to a color vertex. Specifically, the green region Zg is a quadrangle formed by four points, i.e. the white point W, the green vertex Gh and two adjacent pedals gb and gr; the red region Zr is a quadrangle formed by four points, i.e. the white point W, the red vertex Rh and two adjacent pedals gr and rb; the blue region Zb is a quadrangle formed by four points, i.e. the white point W, the blue vertex Bh and two adjacent pedals rb and gb. Since the green direction deviation corresponding to the green vertex is in a clockwise direction, a correction direction in the region Zg for color correction is clockwise. Similarly, a correction direction in the region Zr for color correction is counterclockwise, and a correction direction in the region Zb for color correction is clockwise.

It can be appreciated that, in region Zg, a color coordinate on the straight line WGh has the biggest amount of correction compared with the other color coordinates with the same distance to the white point W. The farther the original color coordinate offsets from the straight line WGh is, the smaller amount of correction required is. Moreover, for two original color coordinates both located on the straight line WGh, the one closer to the white point W requires smaller amount of correction. When the original color coordinate is on the perpendicular lines Wgb and Wgr, the correction angle required is zero, i.e. no color correction is required.

Taking the region Zg as an example, the correction angle D can be calculated based on the green direction deviation Dg and a distance from the original color coordinate of a pixel to the straight line Wgb or Wgr. The corrected color coordinate can be calculated based on the correction angle D. Similarly, the calculation of the corrected angles in the regions Zr and Zb are the same as that in the region Zg. In the following, the calculation of the correction angle D in the region Zg is described.

First, the same as the method described with reference to the embodiment shown in FIG. 4, a tangent value tan_green of the green direction deviation, a tangent value tan_red of the red direction deviation and a tangent value tan blue of the blue direction deviation can be obtained based on Equations (1) and (2) and the similar method.

Afterwards, a correction parameter adj_coeff can be calculated using Equation (5):

$$adj\_coeff = dist\_p0\_Wgb / dist\_Gh\_gb \quad (5)$$

wherein dist_p0 Wgb denotes a distance from the original color coordinate $p_0$ to the straight line Wgb, while dist_Gh_gb denotes a distance from the green vertex Gh to the point gb. It can be seen that, the smaller the distance from the original color coordinate$p_0$ to the straight line Wgb is, the smaller the correction parameter is.

After that, a tangent value tanD of the correction angle D can be calculated using Equation (6).

$$tanD = tan\_green * adj\_coeff * adj\_coeff \quad (6)$$

In this way, after the correction angle D or its tangent value is determined, similar to the embodiment shown in FIG. 4, a corrected color coordinate $P_1$ which takes into account the correction angle can be calculated using Equation (4), i.e. the original color coordinate $P_0(u_{p0}, v_{p0})$ can be corrected to the coordinate $P_1(u_{p1}, v_{p1})$ shown in FIG. 5.

Subsequent to step 306, in step 308, for each pixel in the original image, the corrected color coordinate of the pixel may be mapped into the target color gamut to generate a target color coordinate of the pixel in the target color gamut.

Specifically, after color correction, the color shift issue that may exist for color gamut compression can be overcome, and accordingly, color mapping can be performed on the corrected color to obtain the desired target color coordinate. It can be appreciated that the original color gamut shown in FIGS. 1, 4 and 5 is color gamut BT.2020 which has a bigger range while the target color gamut is color gamut BT.709 which has a smaller range, and therefore the color mapping for these two color gamut is actually gamut compression, i.e. the target color coordinate is closer to the white point compared with the original color coordinate and the corrected color coordinate. In some other embodiments, the target color gamut may have a bigger than the original color gamut, and thus such color mapping is actually gamut expansion, i.e. the target color coordinate is farther away from the white point compared with the original color coordinate and the corrected color coordinate. In the following, the invention is described using color gamut compression as an example, with reference to FIG. 1, however, a person skilled in the art would readily appreciate variants to the example based on practical applications.

As shown in FIG. 1, it is assumed that the corrected color coordinate of a pixel is $P_1(u_{p1}, v_{p1})$, while the intersection points of the straight line $WP_1$ and the corresponding boundaries of the color gamut BT.709 and BT.2020 are point a'$(u_{a'}, v_{a'})$ and point b'$(u_{b'}, v_{b'})$, respectively. As such, segments Wa', Wb' and $WP_1$ can be obtained. Based on the respective lengths of the segments Wa', Wb' and $WP_1$, a distance from the target color coordinate $P_2(u_{p2}, v_{p2})$ to the white point $W(u_w, v_w)$ can be calculated using linear mapping Equation (7).

$$WP_2 = Wb' * WP_1 / Wa' \quad (7)$$

In some other embodiments, the coordinate $P_1$ can be mapped to the coordinate $P_2$ in the color gamut BT.709 using a non-linear mapping algorithm. The mapping ratio can be calculated using the following method.

First, a first compression parameter$C_1$ is calculated. It is assumed that a distance from the white point W to a point a' $(u_{a'}, v_{a'})$ on the boundary of the color gamut BT.2020 is Wa', and a distance from the white point W to a point b' $(u_{b'}, v_{b'})$ on the boundary of the color gamut BT.709 is Wb', and a distance from the corrected color coordinate $P_1$ to the white point W is $WP_1$. Accordingly, the first compression parameter C1 can be calculated using Equation (8)

$$C_1 = Wa'/Wb' - 1 \quad (8)$$

$$r\_WP_1 = WP_1 / Wb' \quad (9)$$

wherein $r\_WP_1$ denotes a position of point $P_1$ relative to the boundary of the color gamut BT.709, which indicates that point $P_1$ is outside of the boundary of the color gamut BT.709 when $r\_WP_1$ is greater than 1. Thus, different methods can be used for performing the mapping based on the relative positions of point $P_1$ as below.

If $r\_WP_1$ is greater than $1 + C_1$, then the mapping ratio R=1;

If $r\_WP_1$ is smaller than $1 - C_2$, then the mapping ratio R can be calculated using Equation (10).

$$R = pix\_dis - adivb * (C_2 - bdisa) * (C_2 - bdisa) \quad (10)$$

wherein adivb=$C_1$/(($C_2$-$C_1$)*($C_2$-$C_1$)), bdisa=sqrt($C_2$*$C_2$+ ($C_1$-$C_2$)*(r_$WP_1$+$C_2$-1)), pix_dis=sqrt(Wa'/Wb').

If 1-$C_2$<r_$WP_1$<1+$C_1$, then the mapping ratio R=r_$WP_1$.

The second compression parameter $C_2$ can be determined based on reference color statistics information. In some embodiments, the second compression parameter $C_2$ can be calculated using Equation (11).

$$C_2=1-r\_avg*coefficient \quad (11)$$

wherein r_avg denotes a statistical average value of the out-range levels of the out-range pixels, and the parameter coefficient may be an empirical value such as 0.7.

In some other embodiments, the second compression value $C_2$ can be set as a predetermined value such as a value ranging from 0.15 to 0.2 typically. In such circumstances, the color mapping can be performed without the reference color statistics information.

It can be appreciated that, after the mapping ratio is determined, the target color coordinate $P_2(u_{p2}, v_{p2})$ can be calculated using the mapping ratio R based on the following Equations (12).

$$u_{p2}=(u_b-u_W)*R+u_w$$

$$v_{p2}=(v_b-v_W)*R+v_w \quad (12)$$

In this way, the original color coordinate $P_0(u_{p0}, v_{p0})$ of the pixel can be corrected and converted into the target color coordinate $P_2(u_{p2}, v_{p2})$ which is in compliance with the format of the target color gamut.

It should be noted that the above color conversion relates to the conversion of color gamut format. In some circumstances, the original lightness format of the original image may differ from the target lightness format of the target image, besides the above difference in color gamut format. For example, the original image may have a lightness format of HDR 10 which is of high dynamic range, while the target image may have a lightness format of SDR which is of a smaller dynamic range. In some embodiments of the present application, there is provided a method for lightness format conversion, which can be used along with or separately from the color gamut format conversion method shown in FIGS. 2 and 3.

Figure 6:
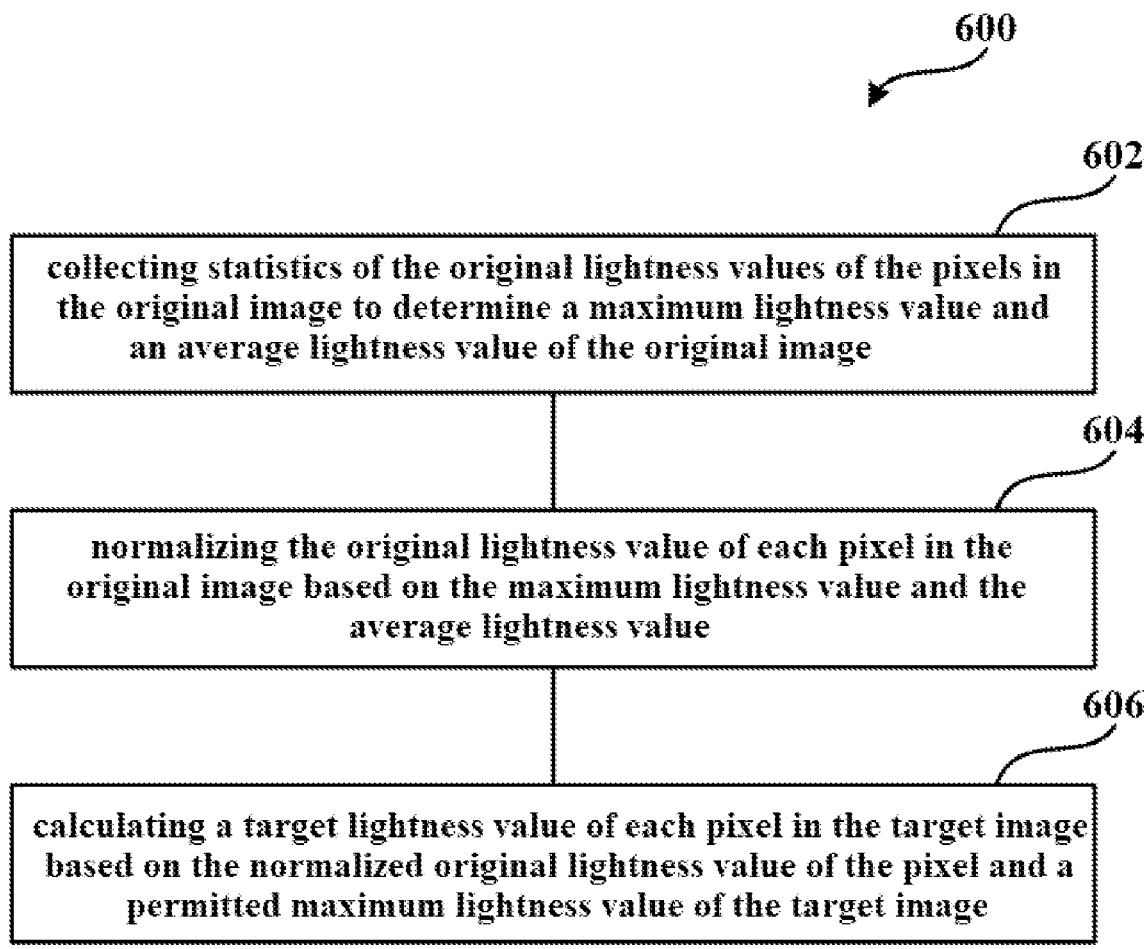
FIG. 6 shows an image processing method 600 according to an embodiment of the present application.

FIG. 6 shows an image processing method 600 according to an embodiment of the present application, which can be used for conversion of image lightness formats. It can be appreciated that, each frame of a video may have different lightness statistical values, such as maximum lightness value and average lightness value. In some embodiments, the lightness values of all the frames may be converted using the same lightness mapping equation or curve. Accordingly, the lightness value of each frame should be normalized in advance.

As shown in FIG. 6, in step 602, the statistics of the original lightness of the pixels in the original image is collected to determine a maximum lightness value and an average lightness value of the original image.

Specifically, the statistical lightness values are parameters indicative of the overall lightness of the entire original frame, which can be the average lightness value or the medium lightness value of the original frame. The obtained maximum lightness value and the statistical lightness value can be used in the normalization of the lightness values. The reason for that both the maximum lightness value and the statistical lightness value such as the average lightness value are used in the statistics collection is that better display effect can be obtained when the lightness of the original image is relatively dark if the average lightness value can be considered. It can be appreciated that, in some other embodiments, only the maximum lightness value may be determined and used for the normalization. In the embodiment shown in FIG. 6, the lightness correction takes into account both the statistical lightness value and the maximum lightness value.

Afterwards, in step 604, the original lightness of each pixel in the original image is normalized based on the maximum lightness value and the average lightness value.

In some embodiments, the lightness of each pixel is normalized to a value ranging from 0 to 1. A rule for the normalized is that a normalized maximum lightness value max_value as calculated is desirably as close to an original lightness upper limit maxcontent (with a typical value of 1000) defined in the original lightness format of the original image as possible, and the normalized maximum lightness value max_value is desirably related to the maximum lightness value and the statistical value collected. Specifically, the normalized maximum lightness value max_value is calculated in relative to the original lightness upper limit maxcontent, because the upper limit maxcontent is the maximum lightness that can be displayed and defined in the original lightness format. Therefore, in some embodiments, the specific value of the normalized maximum lightness value max_value used in the normalization can be close to maxcontent, and is not significantly smaller than or greater than maxcontent. In some embodiments, the value of the normalized maximum lightness value can be set between 0.8*maxcontent to 2*maxcontent. It can be appreciated that, in some other embodiments, the normalized maximum lightness value max_value can be set as other values defined based on maxcontent such as between 0.7*maxcontent to 2.1*maxcontent, which is not limited herein.

Similar to the setting of the normalized maximum lightness value, in some embodiments, several different lightness thresholds can be defined using the original lightness upper limit maxcontent, and corresponding normalization can be implemented based on the comparison between these lightness thresholds with the maximum lightness value max_lum in the original image. For example, a first lightness threshold threshold1 and a second threshold threshold2 can be defined using the original lightness upper limit maxcontent, which respectively indicate the segmented lightness thresholds when calculating the normalized maximum lightness value max_value.

In some embodiments, the first lightness threshold threshold1 and the second lightness threshold threshold2 can be represented using Equations (13) and (14).

$$threshold1=maxcontent/coeff1 \quad (13)$$

$$threshold2=coeff2*maxcontent \quad (14)$$

wherein coeff1 and coeff2 are predetermined adjustment parameters, and different values of coeff1 and coeff2 may adjust and set the first lightness threshold. It can be appreciated that the adjustment parameters can be set according to actual needs. In some embodiments, coeff1 may preferably be set as 1.2 and coeff2 may preferably be set as 2.0, which substantially corresponds to the requirement that the normalized maximum lightness value max_value is set as between 0.8*maxcontent and 2*maxcontent. Accordingly, threshold1<threshold2.

When the collected maximum lightness value in the original image, i.e. max_lum<=threshold1, the normalized maximum lightness value max_value can be calculated using Equation (15).

$$max\_value=max\_lum*coeff1 \quad (15)$$

wherein max_value may be further limited between threshold1 and maxcontent, such as having max_value to satisfy Equation (16).

$$max\_value=max(threshold1, min(max\_value, maxcontent)) \quad (16)$$

It can be seen that max_value is equal to maxcontent when max_lum is equal to threshold1.

For the calculation of Equations (15) and (16), it can be seen that since the maximum lightness value in the original image is smaller than or equal to the first lightness threshold, which indicates that the maximum lightness value in the original image is relatively low, it is desired to improve the normalized maximum lightness value max_value a little when performing the normalization to move the normalized maximum lightness value closer to the original lightness upper limit maxcontent. It can be seen that the greater the adjustment parameter coeff1 is, the improvement of the normalized maximum lightness value is.

Moreover, if the maximum lightness value max_lum in the original image is relatively high, i.e. when threshold1<=max_lum<threshold2, the normalized lightness value can be calculated using Equation (17).

$$max\_value=maxcontent+(max\_lum-maxcontent/coeff1)*coeff3 \quad (17)$$

Since the maximum lightness value reaches maxcontent when threshold1<=max_lum, an increment is used as the adjustment value based on maxcontent, which may include two parts of adjustment, i.e. a first part (max_lum−maxcontent/coeff1) and a second part coeff3. Specifically, for the first part (max_lum−maxcontent/coeff1) (see the definition of the first lightness threshold, which can be represented as (max_lum-threshold1)), it should have a value of 0 when max_lum is equal to threshold1, and the value of the first part may increase with max_lum.

The second part coeff3 is an adjustable parameter. When coeff3 is equal to coeff1, the relationship between max_value and max_lum is actually a non-segmented linear function. However, when coeff3 is not equal to coeff1, then a ratio between these two parameters actually determines a slope of the linear function when max_lum is greater than the first lightness threshold. In some embodiments, coeff3 can be set as between 0.8 and 1.5. It can be seen that, setting the parameter coeff3 enhances the flexibility of the algorithm.

Figure 7:
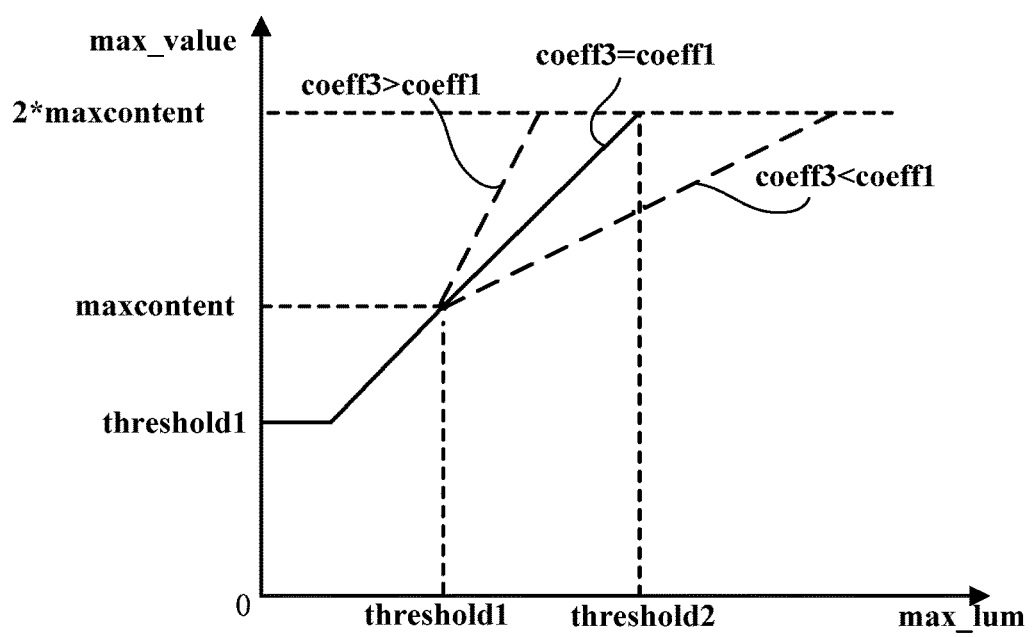
FIG. 7 show that a normalized maximum lightness value changes with a maximum lightness value of an original image.

FIG. 7 shows that the normalized maximum lightness value max_value changes with the maximum lightness max_lum in the original image. As shown in FIG. 7, the relationship between max_value and max_lum depends on the ratio between coeff3 and coeff1. Moreover, according to FIG. 7 and Equations (15) and (17), it can be seen that coeff1 can adjust the slope of the function when max_lum is smaller than threshold1, and coeff3 can further adjust the slope when max_lum is greater than threshold1 further to the adjustment based on coeff1. In some embodiments, a difference between the average lightness value and the maximum lightness value may be considered and used to correct the normalized maximum lightness value max_value as calculated using the above method.

Specifically, a difference factor delta between the average lightness value and the maximum lightness value in the original image can be calculated using Equation (18)

$$delta=ln(lum\_r/base\_r)*coeff5 \quad (18)$$

wherein lum_r denotes a ratio between the average lightness value avg_lum and the maximum lightness value, i.e. lum_r=avg_lum/max_lum, while base_r is a predetermined adjustment parameter.

Specifically, the greater lum_r is, the greater possibility that pixels having the maximum lightness value or a lightness close to the maximum lightness value in the original image is. Therefore, the normalized maximum lightness value max_value can be increased based on the above calculation. In contrast, the smaller lum_r is, the smaller possibility that pixels having the maximum lightness value or a lightness close to the maximum lightness value in the original image is. Therefore, the normalized maximum lightness value max_value can be decreased based on the above calculation. Accordingly, in some embodiments, the value of base_r can be configured based on actual applications. Moreover, with reference to Equations (19), (20) and (20), it can be seen that, if lum_r is greater than base_r, then max_value may increase, while if lum_r is smaller than base_r, then max_value may decrease.

It can be seen from Equation (18), the specific value of base_r directly depends on whether the difference factor is positive or negative in value, and therefore base_r can be adjusted based on statistical data in actual applications. It is found based on statistics, when lum_r is equal to 0.2, it is not desired to adjust the value of max_value, and then base_r can be set as 0.2 in general applications. The value of base_r can be set smaller in some low-lightness scenarios and set greater in some high-lightness scenarios.

Coeff5 is an adjustable ratio factor for adjusting the impact of the value of ln(lum_r/base_r) to max_value, which can be set more flexibly. In some embodiments, the typical value of base_r can be set as 0.2, and the adjustment factor coeff5 can be set as 200 typically.

Based on the above considerations, in some embodiments, the value of max_value can be calculated with reference to the difference factor delta. For example, in the following embodiment the difference factor is used in the calculation.

If max_lum<=threshold1, then $$max\_value=max\_lum*coeff1+delta \quad (19)$$

Moreover, the value of max_value can be limited similarly using Equation (16).

If threshold1<max_lum<=threshold2, then $$max\_value=maxcontent+(max\_lum-maxcontent/coeff1)*coeff3+delta \quad (20)$$

Similarly, in this circumstance, the value of max_value can be limited using Equation (21):

$$max\_value=min(max\_value, threshold2) \quad (21)$$

If max_lum>threshold2, then $$max\_value=maxcontent*coeff4+delta \quad (22)$$

Similarly, the value of max_value can be limited using Equation (23):

$$max\_value=min(max\_value, threshold2) \quad (23)$$

It can be seen that coeff4 and threshold2 together determine the maximum value of max_value. Generally, coeff4 is equal to or greater than coeff2. Coeff4 determines a level of the maximum value of the current normalized lightness value max_value.

After determining the normalized maximum lightness value max_value, the lightness value Li(x, y) (x, y denote the horizontal coordinate and the vertical coordinate of the pixel in the original image, respectively) of each pixel in the original image can be normalized as below.

If Li(x, y)>max_value, then the normalized lightness value Li'(x, y)=1; otherwise, the normalized lightness value Li'(x, y)=Li(x, y)/max_value.

After determining the normalized lightness value, in step 606, a target lightness value of each pixel in the target image can be calculated based on its normalized lightness value and the maximum lightness value permitted in the target image.

Figure 8:
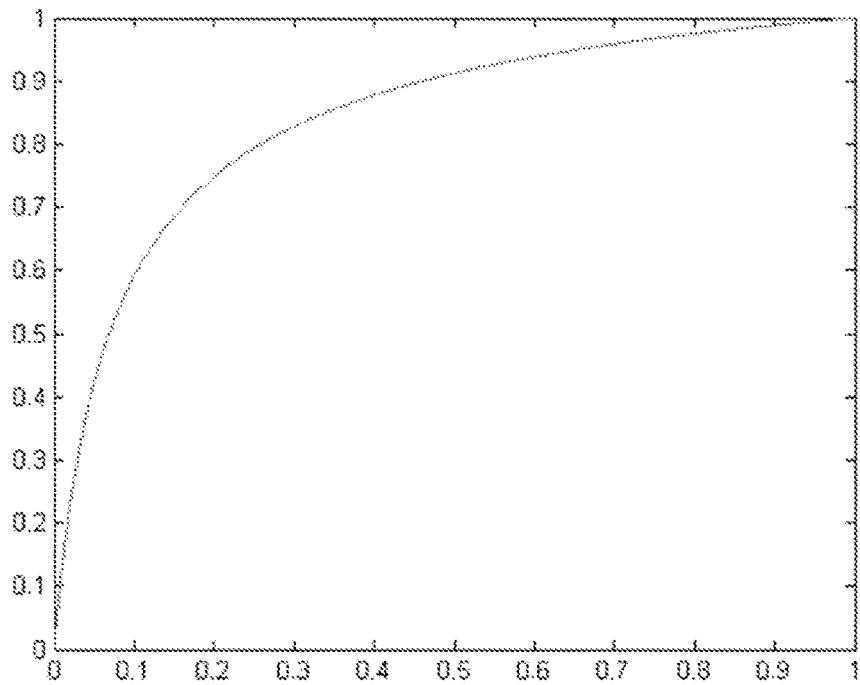
FIG. 8 shows an example of a global mapping curve.

Specifically, global mapping may be performed on the normalized lightness values using a global mapping function. The global mapping function can be a non-linear mapping equation (24) as below:

$$Li''(x,y)=(Li'(x,y)*(Li'(x,y)*(a+curve\_adj)+b))/(Li'(x,y)*(Li'(x,y)*(c+curve\_adj)+d)+e) \quad (24)$$

Wherein curve_adj=ln(max_value/maxcontent)*coeff6, Li'(x, y) is the input normalized lightness value, Li"(x, y) is the normalized target lightness value. Curve_adj is an adjustment parameter of the mapping function which can slightly adjust the mapping function curve based on max_value of the current image, or based on other statistical value(s) that can represent the overall lightness of the image. Coeff6 is another adjustment parameter. Maxcontent is the original lightness upper limit of the original image. FIG. 8 shows an example of the global function curve.

It can be appreciated that the mapping effect may change by adjusting the values of parameters a, b, c, d and e. Also, (a+b) is equal to (c+d+e) to ensure that the input and output of the functions at the two ends (0 and 1) and align with each other and do not exceed the range of 0 to 1. The difference between a and c should not be too big, and the smaller e is, the bigger the input value can be amplified when the input value is smaller. With the adjustment parameter curve_adj, the mapping function curve can be slightly elevated (not exceeding the range of 0 to 1) based on the current maximum lightness value, which can have the adjustment of the curve satisfy the change of the maximum lightness value.

When the above restrictions can be satisfied, the values of a, b, c, d and e can be adjusted based on experience and the actual mapping function. In some embodiments, a=3.64, b=1.65, c=3.19, d=1.99, e=0.11. Moreover, the adjustment parameter coeff6 can be set as between 50 and 70. The greater coeff6 is, the greater curve_adj is. The mapping function curve may be elevated (moving upward as shown in FIG. 8) with the increase of the value of curve_adj.

It can be appreciated that the above non-linear mapping equation (24) is an exemplary non-linear mapping method, and any suitable non-linear mapping can be used to calculate the normalized target lightness values.

After obtaining the normalized target lightness values, the target lightness values of the pixels in the target image can be calculated with further reference to the target lightness upper limit defined in the target lightness format of the target image. In some embodiments, the target lightness values can be calculated by multiplying the normalized lightness values each corresponding to a pixel with the target lightness upper limit.

In this way, the original lightness format used in the original image can be converted into the target lightness format used in the target image. It can be appreciated that the lightness conversion method shown in FIG. 6 can be implemented separately from the color gamut conversion methods shown in FIGS. 2 and 3.

It should be noted that, although various steps, sub-steps, modules or sub-modules of image processing methods and devices are mentioned in the forgoing detailed description, such division is merely exemplary but not mandatory. In fact, according to the embodiments of the application, features and functions of two or more modules described above can be specified in one module. On the contrary, features and functions of one module described above can be further divided into multiple modules to be specified.

Those skilled in the art may understand and implement other variations to the disclosed embodiments from a study of the drawings, the disclosure, and the appended claims. In the claims, the terms "comprise" or "comprising" do not exclude other elements or steps, and the terms "a" or "an" do not exclude a plurality. In practical applications according to the present application, one element may perform functions of several technical features recited in claims. Any reference symbols in the claims should not be construed as limiting the scope.

What is claimed is:

1. An image processing method for converting an original image represented in an original color gamut to a target image represented in a target color gamut, wherein the image processing method comprises:
    A) calculating a set of primary color direction deviations between a set of original primary color directions of the original color gamut and a set of target primary color directions of the target color gamut, wherein each of the set of primary color direction deviations corresponds to a primary color;
    B) determining, for each pixel in the original image, a corrected color coordinate of the pixel based on a set of offsets of an original color coordinate of the pixel in the original color gamut relative to the set of original primary color directions and the set of primary color direction deviations; and
    C) mapping, for each pixel in the original image, the corrected color coordinate of the pixel into the target color gamut to generate a target color coordinate of the pixel in the target color gamut.

2. The image processing method of claim 1, wherein step B further comprises:
    dividing the original color gamut into color sub-regions based on respective original color directions of each two adjacent primary colors of the original color gamut;
    calculating, for original color coordinates in each color sub-region, their respective corrected color directions based on one or two primary color directions associated with the color sub-region and one or more primary color direction deviations corresponding to the one or more primary color directions; and
    calculating, for the original color coordinates in each color sub-region, their respective corrected color coordinates based on their respective corrected color directions and original color coordinates.

3. The image processing method of claim 2, wherein the color sub-regions comprise a first color sub-region defined by an original red direction and an original blue direction, a second color sub-region defined by an original green direction and the original red direction, and a third color sub-region defined by the original green direction and the original blue direction.

4. The image processing method of claim 2, wherein the color sub-regions comprise a first color sub-region adjacent to an original red direction, a second color sub-region adjacent to an original green direction and a third color sub-region adjacent to an original blue direction.

5. The image processing method of claim 1, wherein step C comprises:
- calculating, for each pixel in the original image, a corrected color direction of the original color coordinate of the pixel in the original color gamut; and
- calculating, for each pixel in the original image, the target color coordinate of the original color coordinate of the pixel in the target color gamut based on respective relative positions of the original color coordinate of the pixel relative to a corresponding boundary of the original color gamut and a corresponding boundary of the target color gamut in the corrected color direction.

6. The image processing method of claim 5, wherein the method further comprises:
- D) collecting statistics of color information of the pixels in the original image to obtain color statistics information; and
- wherein the step of calculating, for each pixel in the original image, the target color coordinate of the original color coordinate of the pixel in the target color gamut further comprises calculating the target color coordinate by referring to the color statistics information.

7. The image processing method of claim 1, wherein the method further comprises:
- E) adjusting an original lightness value of each pixel in the original image to convert the original image represented in an original lightness format to the target image represented in a target lightness format.

8. The image processing method of claim 7, wherein step D further comprises:
- collecting statistics of the original lightness values of the pixels in the original image to determine a maximum lightness value and an average lightness value of the original image;
- normalizing the original lightness value of each pixel in the original image based on the maximum lightness value and the average lightness value; and
- calculating a target lightness value of each pixel in the target image based on the normalized original lightness value of the pixel and a permitted maximum lightness value of the target image.

9. An image processing device for converting an original image represented in an original color gamut to a target image represented in a target color gamut, where in the image processing device comprises a non-volatile computer readable storage medium storing thereon one or more executable instructions which can be executed by a processor to perform the following steps:
- A) calculating a set of primary color direction deviations between a set of original primary color directions of the original color gamut and a set of target primary color directions of the target color gamut, wherein each of the set of primary color direction deviations corresponds to a primary color;
- B) determining, for each pixel in the original image, a corrected color coordinate of the pixel based on a set of offsets of an original color coordinate of the pixel in the original color gamut relative to the set of original primary color directions and the set of primary color direction deviations; and
- C) mapping, for each pixel in the original image, the corrected color coordinate of the pixel into the target color gamut to generate a target color coordinate of the pixel in the target color gamut.

10. A non-transitory computer readable storage medium storing thereon one or more executable instructions which can be executed by a processor to perform an image processing method for converting an original image represented in an original color gamut to a target image represented in a target color gamut, wherein the image processing method comprises the following steps:
- A) calculating a set of primary color direction deviations between a set of original primary color directions of the original color gamut and a set of target primary color directions of the target color gamut, wherein each of the set of primary color direction deviations corresponds to a primary color;
- B) determining, for each pixel in the original image, a corrected color coordinate of the pixel based on a set of offsets of an original color coordinate of the pixel in the original color gamut relative to the set of original primary color directions and the set of primary color direction deviations; and
- C) mapping, for each pixel in the original image, the corrected color coordinate of the pixel into the target color gamut to generate a target color coordinate of the pixel in the target color gamut.

* * * * *